(12) United States Patent
Suganuma

(10) Patent No.: US 8,489,795 B2
(45) Date of Patent: Jul. 16, 2013

(54) PCI-EXPRESS COMMUNICATION SYSTEM AND PCI-EXPRESS COMMUNICATION METHOD

(75) Inventor: Shigeru Suganuma, Tokyo (JP)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 12/749,055

(22) Filed: Mar. 29, 2010

(65) Prior Publication Data

US 2010/0250823 A1 Sep. 30, 2010

(30) Foreign Application Priority Data

Mar. 30, 2009 (JP) ................................ 2009-083193

(51) Int. Cl.
*G06F 13/36* (2006.01)

(52) U.S. Cl.
USPC ........................................................ 710/312

(58) Field of Classification Search
USPC ........................................................ 710/312
See application file for complete search history.

(56) References Cited

U.S. PATENT DOCUMENTS

| 6,112,311 | A  | * | 8/2000  | Beardsley et al. ............... 714/3 |
| 6,490,644 | B1 | * | 12/2002 | Hyde et al. .................... 710/125 |
| 7,046,668 | B2 | * | 5/2006  | Pettey et al. ................... 370/392 |
| 7,096,305 | B2 | * | 8/2006  | Moll .............................. 710/312 |
| 7,293,129 | B2 | * | 11/2007 | Johnsen et al. ................. 710/313 |
| 7,380,018 | B2 | * | 5/2008  | Moll .............................. 709/239 |
| 7,506,084 | B2 | * | 3/2009  | Moerti et al. ..................... 710/52 |
| 7,562,176 | B2 | * | 7/2009  | Kloeppner et al. ............ 710/314 |
| 7,752,346 | B2 | * | 7/2010  | Talayco et al. ..................... 710/9 |
| 7,979,621 | B2 | * | 7/2011  | Gregg ........................... 710/316 |
| 8,200,880 | B2 | * | 6/2012  | Higuchi et al. ................ 710/313 |
| 2011/0320653 | A1 | * | 12/2011 | Lais et al. ........................ 710/65 |

FOREIGN PATENT DOCUMENTS

| JP | 5-189346   | A | 7/1993  |
| JP | 2006302250 | A | 11/2006 |
| JP | 2007-148621| A | 6/2007  |

OTHER PUBLICATIONS

Japanese Office Action for JP2009-083193 mailed on Feb. 5, 2013 with Partial English Translation.

* cited by examiner

*Primary Examiner* — Paul R Myers

(57) ABSTRACT

A PCI-Express communication system includes a first PCI-Express=PCI-Express bridge connected with an external route complex through a first PCI-Express switch, and configured to perform an address translation on a packet received from the first PCI-Express switch to assign a parameter indicating a first route to a target address of the packet; a second PCI-Express=PCI-Express bridge connected with the external route complex through a second PCI-Express switch, and configured to perform an address translation on a packet received from the second PCI-Express switch to assign a parameter indicating a second route to a target address of the packet; and an address filter configured to limit an address range for the packet received from one of the first PCI-Express=PCI-Express bridge and the second PCI-Express=PCI-Express bridge. A route complex is configured to receive the packet from the address filter.

12 Claims, 10 Drawing Sheets

PCI-EXPRESS COMMUNICATION SYSTEM AND PCI-EXPRESS COMMUNICATION METHOD

INCORPORATION BY REFERENCE

This application claims a priority on convention based on Japanese Patent Application No. 2009-083193. The disclosure thereof is incorporated herein by reference.

TECHNICAL FIELD

The present invention generally relates to a PCI (peripheral component interconnect)-Express (registered trademark) communication system, and in particular to a PCI-Express communication system connecting a plurality of PCI-Express-based devices.

BACKGROUND ART

PCI-Express is a serial transfer interface in place of PCI bus, by standardizing 3GIO (3rd Generation I/O). At present, "PCI-Express 1.1" and "PCI-Express 2.0" are known as the standards of PCI-Expression. The PCI-Express 2.0 is of an upper class compatible with PCI-Express 1.1, and equipments for PCI-Express 1.1 are connectable to thereto as they are.

In a transmission path (lane) of a minimum configuration in PCI-Express 1.1, a data transfer rate in a full duplex (FDX) communication is 2.5 Gbps in a unidirectional communication and 5.0 Gbps in a bidirectional communication. Also, in a transmission lane in PCI-Express 2.0, the data transfer rate of a full duplex (FDX) communication is 5.0 Gbps in a unidirectional communication and 10 Gbps in a bidirectional communication. However, in a PCI-Express communication, it is necessary to use 10 bits including 2 bits of a clock signal and so forth in order to transmit an 8-bit data. Therefore, an effective data transfer rate is 2.0 Gbps (250 MB/s) in the unidirectional communication and 4.0 Gbps (500 MB/s) in the bidirectional communication in PCI-Express 1.1, and 4 Gbps (500 MB/s) in the unidirectional communication and 8 Gbps (1 GB/s) in the bidirectional communication in PCI-Express 2.0.

In many cases, an actual PCI-Express port includes a bundle of lanes. A PCI-Express port of one lane is referred to as "PCI-Express x1", and a PCI-Express port of two lanes is referred to as. "PCI-Express x2". A bundle of a plurality of lanes is referred to as a link. At present, products such as x2, x4, x8, x12, x16 and x32 are commercially available. The PCI-Express is often used as a video card interface because of high-speed performance.

Also, the PCI-Express is compliant with a hot plug and a usage method of setting a cassette-type hardware unit to a computer is available. "PCI-Express x1" as well as "USB 2.0" is used in a communication system of "Express Card" of an expansion card specification applied to a new mobile computer in place of a PC card. Regarding PCI-Express, not only a conventional connecting method of inserting a card into an expansion slot is defined but also a specification of "PCI Express Cable" is defined which can connect between equipments via a metal cable of not longer than 10 meters. In addition, at present, a PCI-Express communication system using PCI-Express appears, in which each module is connected by a PCI-Express switch to thereby communicate between the modules based on PCI-Express.

In conjunction with the above description, Japanese Patent Publication (JP 2006-302250A: patent literature 1) discloses a PCI-Express communication system. In this PCI-Express communication system, a node ID of a transfer destination module, a channel ID for use in data transfer and a packet type for discriminating whether the transfer data is a request or a response are set in an address portion of a packet for the data transfer.

In a network communication system, it is necessary to prepare an alternative route at a time of occurrence of a communication failure.

When a communication system using PCI-Express is built, a target address is uniquely determined for every target device. Therefore, in the communication system using PCI-Express, it is necessary to set a different target address for each communication route. As a feature of PCI-Express, an address space should be continuous for every device in a lower layer. This is because of the PCI-Express specification that only an upper limit and a lower limit of an address can be set in an address space of a specific route, in view of a route complex. Also, the address space of route complex is a whole address space which is not assigned to address spaces of devices in the lower layer. Therefore, in one route complex, the address space allocated to a PCI-Express switch connected to another route complex should be separated for every route in the whole address space.

FIG. 1 shows assignment of address spaces on PCI-Express switches. In FIG. 1, the address spaces are separated between a PCI-Express switch under the control of a route complex (RC) 0 and a PCI-Express switch under the control of a route complex (RC) 4. However, since each address space is assigned to a space of the PCI-Express switch under the control of the other route complex, the address space of the route complex is not contained. Therefore, a packet cannot be transmitted to the other route complex as it is without being processed. In a PCI-Express=PCI-Express bridge, an address conversion function is provided in the bridge to separate the address space for every topology when different topologies are connected. By this address conversion function, it becomes possible to transmit a packet between route complexes having different topologies. In FIG. 2, each packet transmitted from a route complex (RC) 1 is converted to an identical address space different from the address space corresponding to each PCI-Express switch. Since this packet is not assigned to a space which is assigned to the switch, it is transferred to a route complex.

However, when the address conversion function is used, the packet is transmitted to the address space of the same route complex, and therefore it is difficult to determine a transmission route of the packet on a route complex side.

In the patent literature 1, a method is disclosed of giving a node ID of a transmission source device in addition to an address of a transmission destination device. However, it is not defined which route is used for transmission when a plurality of communication routes are present. Also, in the patent literature 1, although an embodiment having two routes is shown, there is no explanation at all how to switch the routes.

When address conversion is performed inside the bridge, it becomes possible to confirm a data transmission route by assigning a different unique address for every route. FIG. 3 shows a case where different addresses are assigned in every bridge. However, when different addresses are assigned to the routes, a final address on reaching a route complex is different. Therefore, there arises a problem that an access to an identical address space is mapped to a different address space.

CITATION LIST

Patent Literature 1: JP 2006-302250A

SUMMARY OF INVENTION

In an aspect of the present invention, a PCI-Express communication system includes a first PCI-Express=PCI-Express bridge connected with an external route complex through a first PCI-Express switch, and configured to perform an address translation on a packet received from the first PCI-Express switch to assign a parameter indicating a first route to a target address of the packet; a second PCI-Express=PCI-Express bridge connected with the external route complex through a second PCI-Express switch, and configured to perform an address translation on a packet received from the second PCI-Express switch to assign a parameter indicating a second route to a target address of the packet; and an address filter configured to limit an address range for the packet received from one of the first PCI-Express=PCI-Express bridge and the second PCI-Express=PCI-Express bridge. A route complex is configured to receive the packet from the address filter.

In another aspect of the present invention, a PCI-Express communication method is achieved by receiving a first packet from an external route complex through a first PCI-Express switch; by receiving a second packet from the external route complex through a second PCI-Express switch; by performing an address translation on the first packet to assign a parameter indicating a first route to a target address of the first packet in a first PCI-Express=PCI-Express bridge; by performing an address translation on the second packet to assign a parameter indicating a second route to the target address of the second packet in a second PCI-Express=PCI-Express bridge; by limiting an address range for a reception packet as one of the first packet received from the first PCI-Express=PCI-Express bridge and the second packet received from the second PCI-Express=PCI-Express bridge; and by receiving by a route complex, the reception packet from the address filter.

A PCI-Express device having an address filtering function is provided in a front stage of a route complex. In this way, in a PCI-Express communication system, when address translation is performed, it becomes possible to translate to an identical address space.

BRIEF DESCRIPTION OF DRAWINGS

The above and other objects, advantages and features of the present invention will be more apparent from the following description of certain embodiments taken in conjunction with the accompanying drawings, in which.

DESCRIPTION OF EMBODIMENTS

Hereafter, a PCI-Express communication system of the present invention will be described with reference to the attached drawings.

First Embodiment

Figure 1:
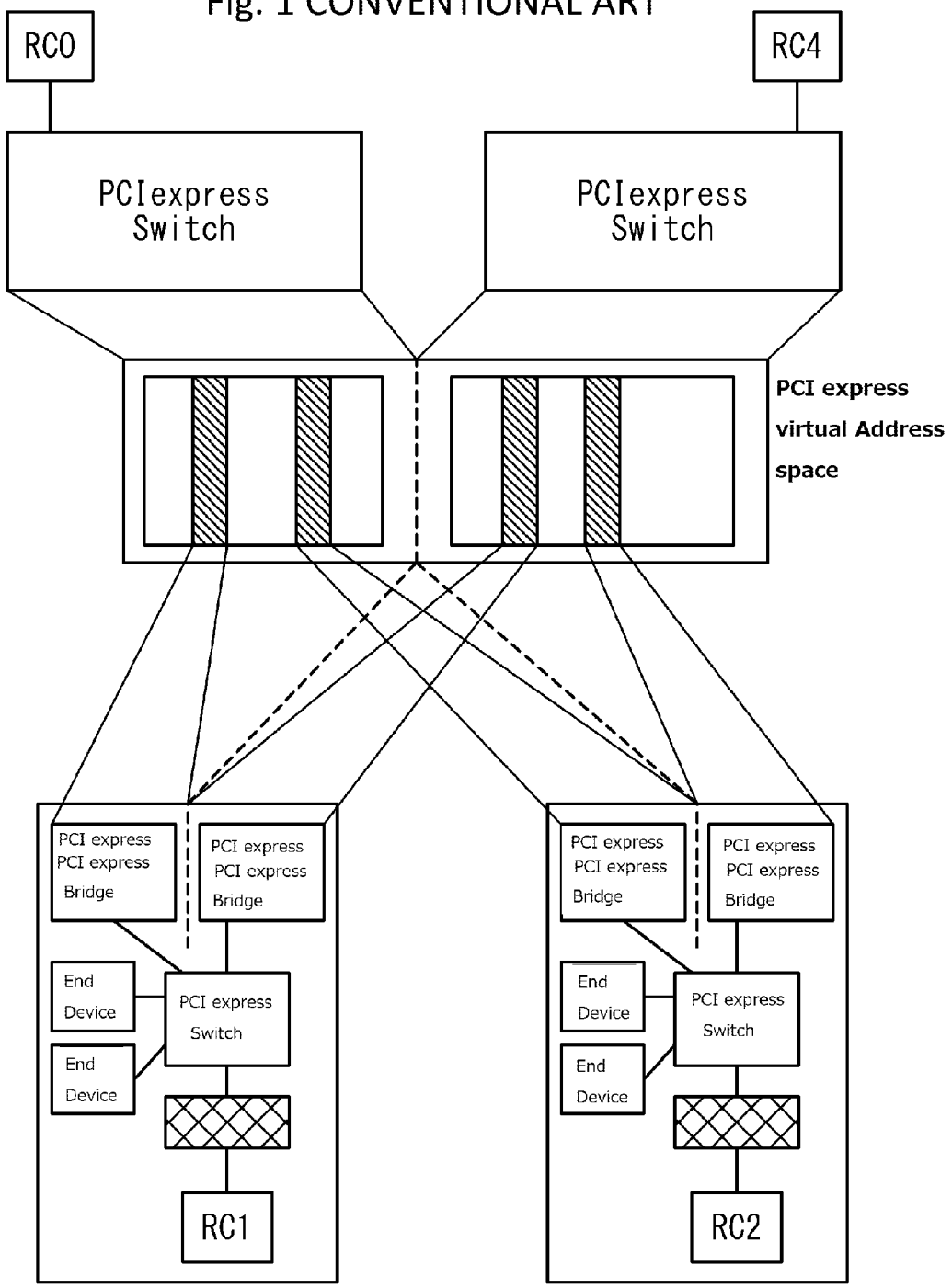
FIG. 1 is a schematic view with respect to assignment of a PCI address space on a PCI-Express switch.
Figure 2:
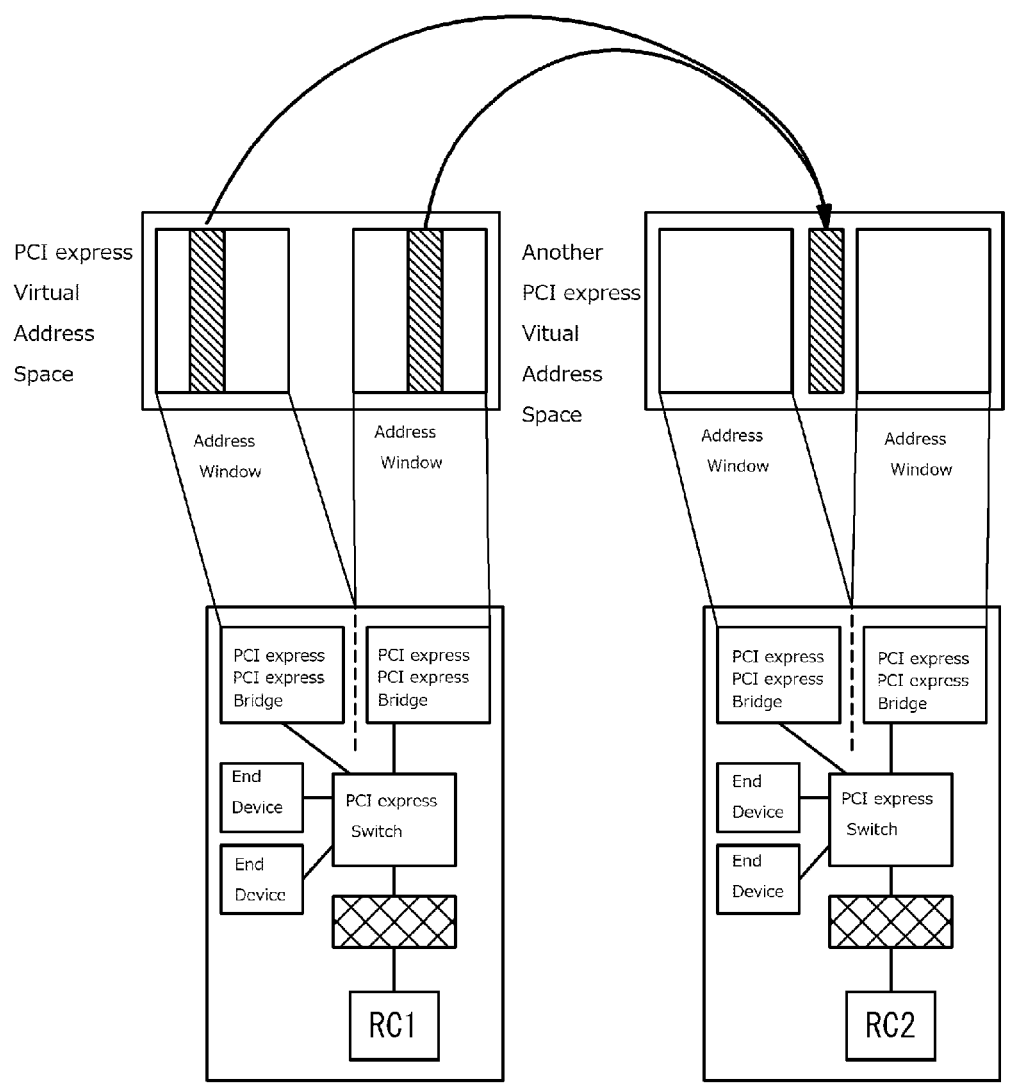
FIG. 2 is a diagram showing an example of a PCI address space when performing address conversion by a PCI-Express switch.
Figure 3:
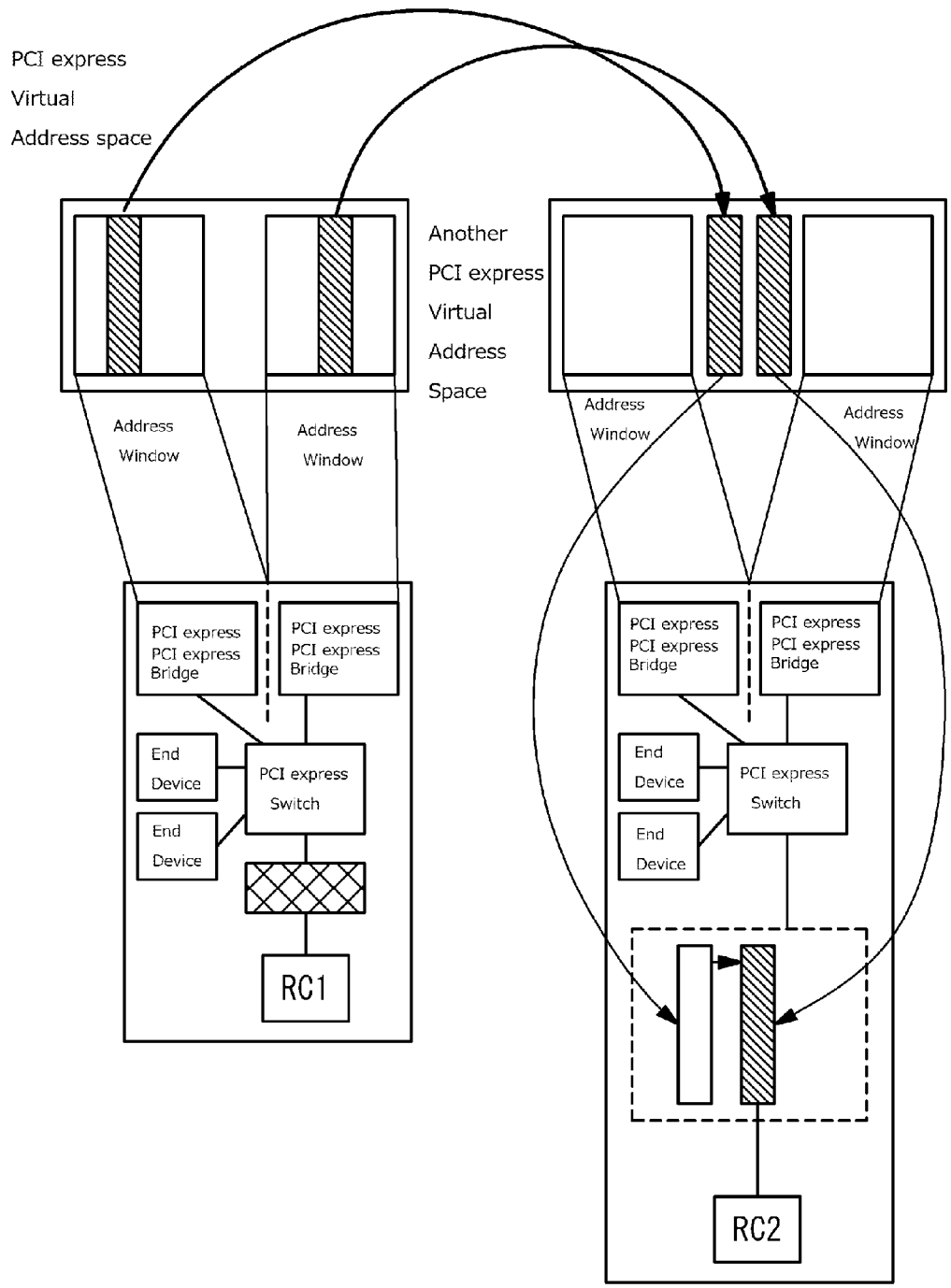
FIG. 3 is a diagram showing an example of a PCI address space when assigning different addresses to every route.
Figure 4:
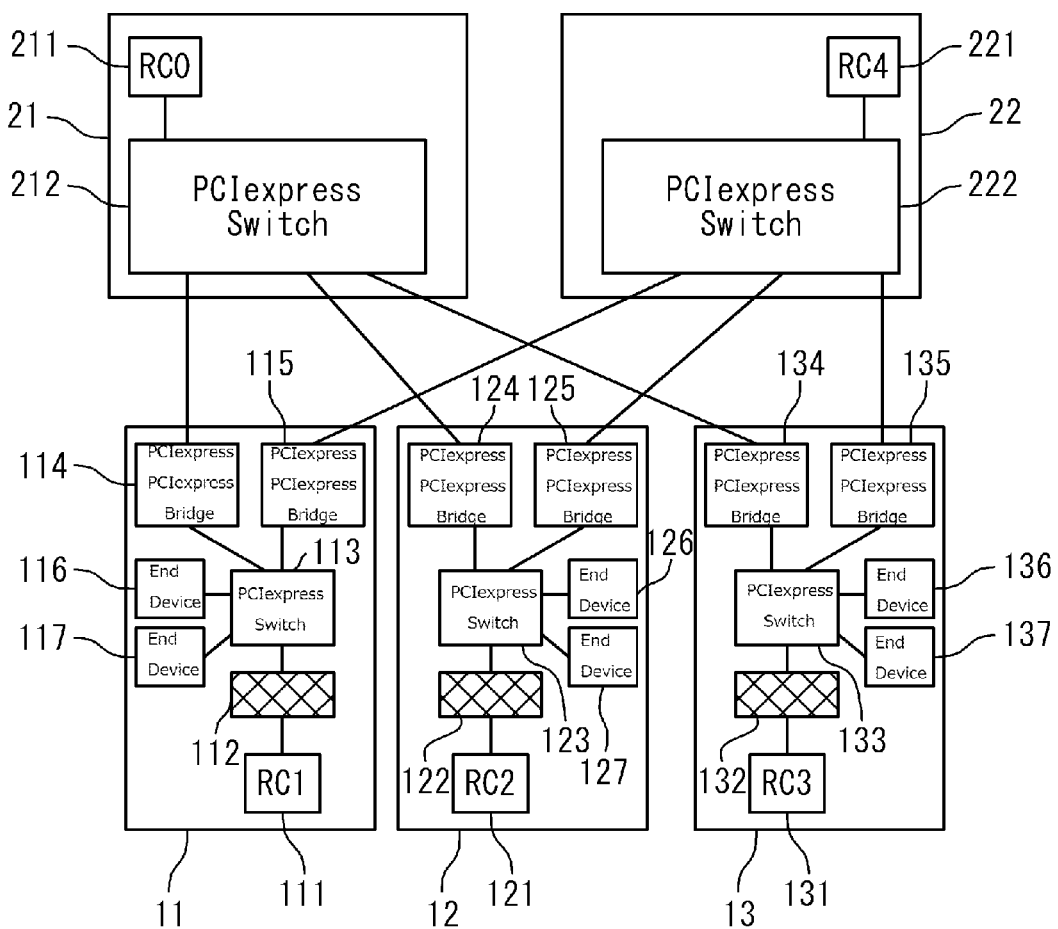
FIG. 4 is a diagram showing an outline of a PCI-Express communication system according to a first embodiment of the present invention.

Referring to FIG. 4, the PCI-Express communication system according to a first embodiment of the present invention includes modules 11, 12, and 13, and switch devices 21 and 22. The modules 11, 12 and 13 are independent PCI-Express communication modules having different route complexes. Here, the PCI-Express communication module is merely referred to as "module" for simplification.

The module 11 is provided with a route complex (RC) 111, an address filter 112, a switch 113, bridges 114 and 115, and devices 116 and 117. The module 12 is provided with a route complex (RC) 121, an address filter 122, a switch 123, bridges 124, and 125, and devices 126 and 127. The module 13 is provided with a route complex (RC) 131, an address filter 132, a switch 133, bridges 134 and 135, and devices 136 and 137.

The route complexes (RC) 111, 121 and 131 are different route complexes. Each route complex is connected to PCI-Express switches via address filtering mechanisms. The route complex (RC) 111 is connected to the switch 113 via the address filter 112. The route complex (RC) 121 is connected to the switch 123 via the address filter 122. The route complex (RC) 131 is connected to the switch 133 via the address filter 132.

The address filters 112, 122 and 132 are address filters mounted on the modules. The switches 113, 123 and 133 are the PCI-Express switches. The PCI-Express switch is merely referred to as a "switch" for simplification. The switch 113 is connected to the address filter 112, the bridge 114, the bridge 115, the device 116 and device 117. The switch 123 is connected to the address filter 122, the bridge 124, the bridge 125, the device 126 and the device 127. The switch 133 is connected to the address filter 132, the bridge 134, the bridge 135, the device 136 and the device 137.

The bridges 114, 115, 124, 125, 134 and 135 are PCI-Express=PCI-Express bridges. The PCI-Express=PCI-Express bridge is merely referred to as a "bridge" for simplification. The bridge 114 connects the module 11 to the switch device 21. The bridge 115 connects the module 11 to the switch device 22. The bridge 124 connects the module 12 to the switch device 21. The bridge 125 connects the module 12 to the switch device 22. The bridge 134 connects the module 13 to the switch device 21. The bridge 135 connects the module 13 to the switch device 22. The devices 116, 117, 126, 127, 136 and 137 are PCI-Express devices implemented in the respective modules.

The switch devices 21 and 22 are PCI-Express switch devices. The PCI-Express switch device is merely referred to as a "switch device" for simplification. The switch device 21 is provided with a route complex (RC) 211 and a switch 212. The switch device 22 is provided with a route complex (RC) 221 and a switch 222.

Here, each of the modules 11, 12 and 13 is assumed to be a semiconductor device or electronic circuit using PCI-Express but not limited to this example. The switch devices 21 and 22 are assumed to be compliant with the PCI-Express communication standard, and to be a communication devices or communication circuits having a line or channel and packet switching functions, but are not limited to these examples. Each of the route complex (RC) 111, the address filter 112, the switch 113, the bridges 114 and 115, the devices 116 and 117, the route complex (RC) 121, the address filter 122, the switch 123, the bridges 124 and 125, the devices 126 and 127, the route complex (RC) 131, the address filter 132, the switch 133, the bridges 134 and 135, the devices 136 and 137 may be implemented by a hardware circuit or a computer program executed by a CPU.

Figure 5:
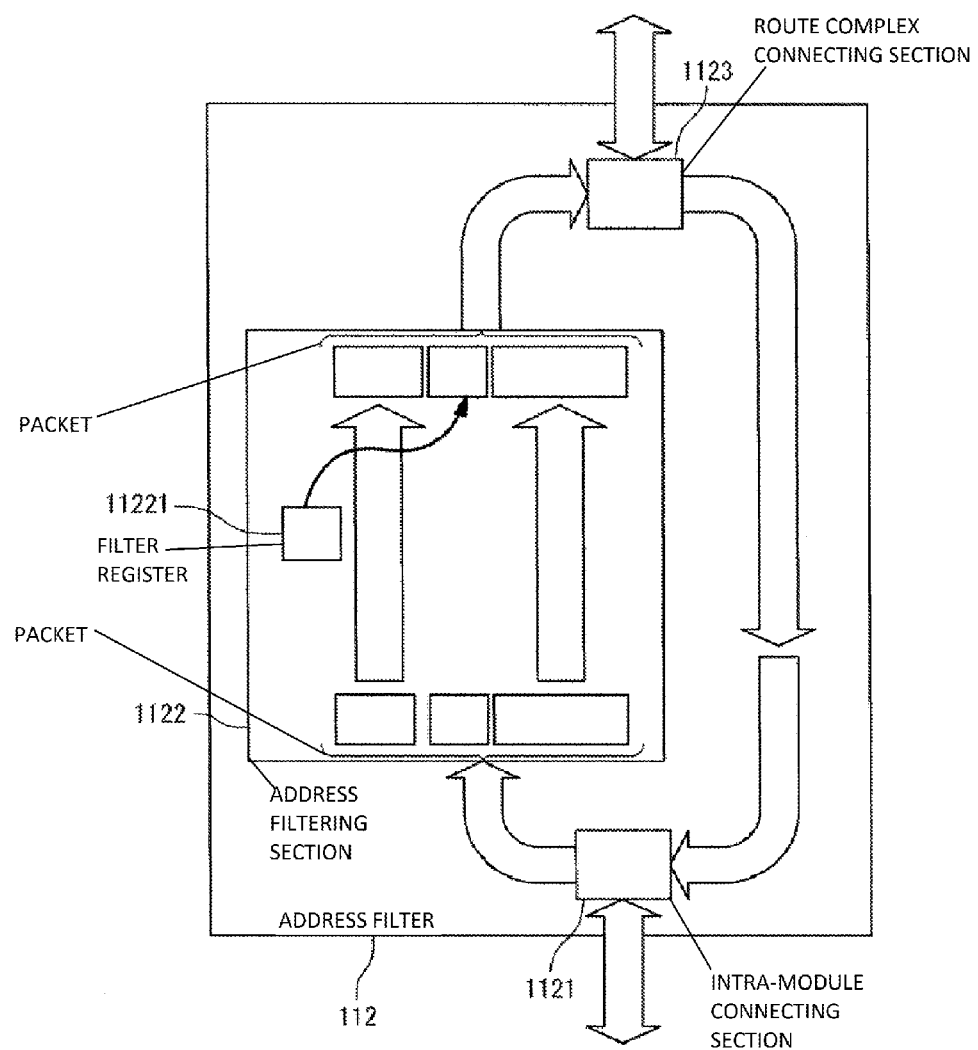
FIG. 5 is a diagram showing details of an address filter according to the first embodiment of the present invention.

FIG. 5 shows a detailed configuration of the address filter according to the present invention. The address filter 112 will be described. The address filter 112 is provided with an intra-module connecting section 1121, an address filtering section 1122 and a route complex connecting section 1123.

The intra-module connecting section 1121 receives a packet from the switch 113 and sends it to the address filtering section 1122. The address filtering section 1122 includes a filter register 11221. The address filtering section 1122 receives a packet from the intra-module connecting section 1121 and extracts an address from the received packet and replaces a peculiar address bit by a data of the filter register 11221. The address filtering section 1122 sends the packet to the route complex connecting section 1123. The route complex connecting section 1123 transfers the packet from the address filtering section 1122 to the route complex (RC) 111. Also, the route complex connecting section 1123 sends a packet received from the route complex (RC) 111 to the intra-module connecting section 1121, just as it is. In this process, the route complex connecting section 1123 may send the packet received from the route complex (RC) 111 to the intra-module connecting section 1121 via the address filtering section 1122, just as it is. The intra-module connecting section 1121 sends the packet received from the route complex connecting section 1123 to the switch 113.

It should be noted that address filters 122 and 132 have the same configuration as that of the address filter 112. The address filter 122 is provided with an intra-module connecting section 1221, an address filtering section 1222 and a route complex connecting section 1223, although not shown. Similarly, the address filter 132 is provided with an intra-module connecting section 1321, an address filtering section 1322 and a route complex connecting section 1323. The intra-module connecting sections 1221 and 1321 are equivalent to the intra-module connecting section 1121 shown in FIG. 5. The address filtering sections 1222 and 1322 are equivalent to the address filtering section 1122 shown in FIG. 5. The route complex connecting sections 1223 and 1323 are equivalent to the route complex connecting section 1123 shown in FIG. 5.

Figure 6:
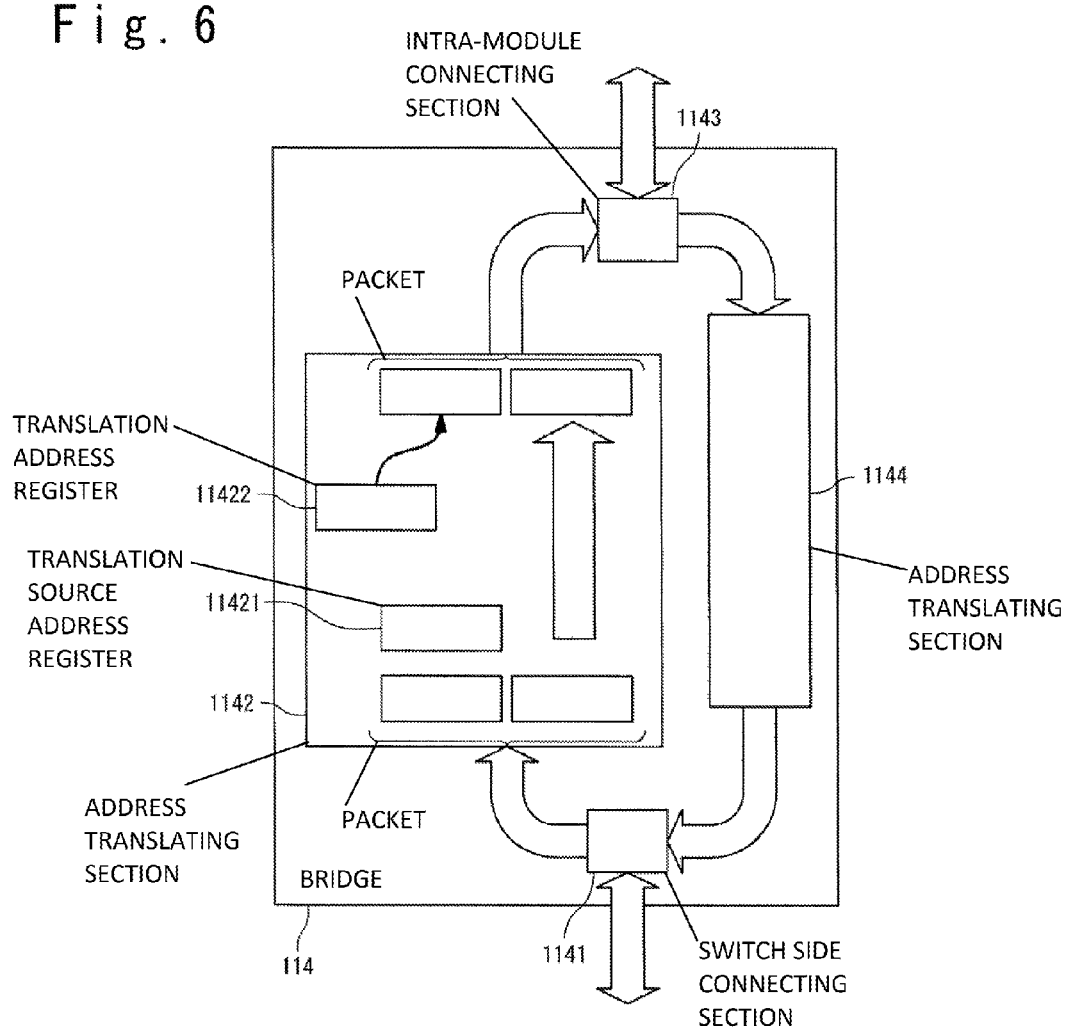
FIG. 6 is a diagram showing details of a PCI-Express=PCI-Express bridge according to the first embodiment of the present invention.

FIG. 6 shows a detailed configuration of the PCI-Express=PCI-Express bridge according to the present invention. The bridge 114 will be described below. The bridge 114 is provided with a switch side connecting section 1141, an address translating section 1142, an intra-module connecting section 1143 and an address translating section 1144.

The switch side connecting section 1141 receives a packet from the switch device 21 and sends it to the address translating section 1142. The address translating section 1142 includes translation source address registers 11421 and a translation address register 11422. The translation source address registers 11421 store upper-bit fields of addresses to be subjected to the address translation. The translation source address register 11421 stores a target module address field indicative of a transfer destination module and a routing address field indicative of a route. The translation address register 11422 stores a local address field of an address of a route complex and a routing address field indicative of the route.

The address translating section 1142 receives a packet from the switch side connecting section 1141, extracts an address from the received packet and compares an upper-bit field of the extracted address with address fields stored in the translation source address registers 11421. When the upper-bit field of the address of the packet is coincident with the address field stored in the translation source address register 11421, the address translating section 1142 replaces the extracted address field by the address field stored in the translation address register 11422, thereby producing a translation packet with an address after the address translation. In addition, the address translating section 1142 sends the translation packet to the intra-module connecting section 1143.

The intra-module connecting section 1143 sends the translation packet to the switch 113. The intra-module connecting section 1143 receives a packet from the switch 113 and sends it to the address translating section 1144. The address translating section 1144 has a configuration similar to that of the address translating section 1142. The address translating section 1144 transfers the packet received from the intra-module connecting section 1143 to the switch side connecting section 1141 without address-translation, just as it is. The switch side connecting section 1141 receives the packet from the address translating section 1144 and transmits it to the switch device 21.

Also, the bridges 115, 124, 125, 134 and 135 have configurations similar to that of the bridge 114. The bridge 115 is provided with a switch side connecting section 1151, an address translating section 1152, an intra-module connecting section 1153 and an address translating section 1154, although not shown. Similarly, the bridge 124 is provided with a switch side connecting section 1241, an address translating section 1242, an intra-module connecting section 1243 and an address translating section 1244. Similarly, the bridge 125 is provided with a switch side connecting section 1251, an address translating section 1252, an intra-module connecting section 1253 and an address translating section 1254. Similarly, the bridge 134 is provided with a switch side connecting section 1341, an address translating section 1342, an intra-module connecting section 1343 and an address translating section 1344. Similarly, the bridge 135 is provided with a switch side connecting section 1351, an address translating section 1352, an intra-module connecting section 1353 and an address translating section 1354.

The switch side connecting sections 1151, 1241, 1251, 1341 and 1351 are equivalent to the switch side connecting section 1141 shown in FIG. 6. The address translating sections 1152, 1242, 1252, 1342 and 1352 are equivalent to the address translating section 1142 shown in FIG. 6. The intra-module connecting sections 1153, 1243, 1253, 1343 and 1353 are equivalent to the intra-module connecting section 1143 shown in FIG. 6. The address translating sections 1154, 1244, 1254, 1344 and 1354 are equivalent to the address translating section 1144 shown in FIG. 6.

Figure 7:
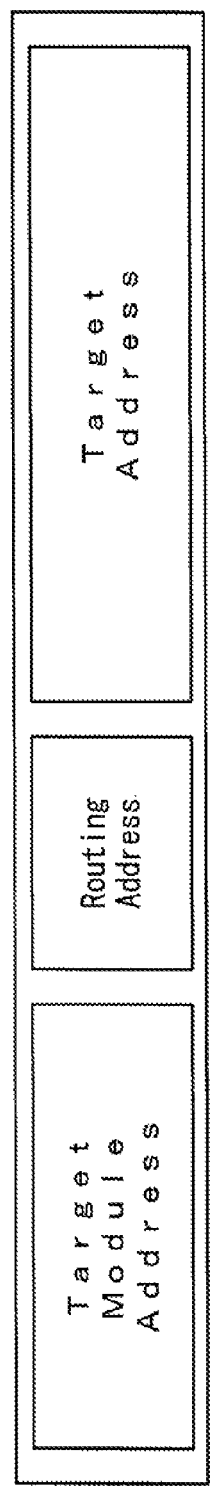
FIG. 7 is a diagram showing a display method of a PCI address according to the present invention.

FIG. 7 shows an example of an address format in the present invention. This address format is for targets. The target address includes a "Target Module Address" field indicating a transfer destination in an upper-bit field, and subsequently a "Routing Address" field and a "Target Address" field. The "Target Module Address" field is an address field for a transfer destination module. The "Routing Address" field is an address field for route data indicating a route through which a packet passed. The "Target Address" field is an address field of a route complex as a target. It should be noted that it is necessary to reserve an area for the number of the routes to be used, as a display area of the "Routing Address" field.

In the present embodiment, since only two PCI-Express communication routes are used per one module, the "Routing Address" field is sufficient to be "1 bit". Here, it is assumed that "0" is set to the "Routing Address" field in the case of a route passing through the switch device 21, and that "1" is set to the "Routing Address" field in the case of a route passing through the switch device 22. However, in practice, under the assumption that "0 (undefined)" has been set in the "Routing Address" field in an initial state before transmission, it is also possible that "0b0" is set to the "Routing Address" field in the case of a route passing through the switch device 21, and that "0b1" is set to the "Routing Address" field in the case of a route passing through the switch device 22. In addition, it is also possible to provide redundancy more than the number of routes for the "Routing Address" field. Also, it may be considered to use a part of the "Target Module Address" field or "Target Address" field as the "Routing Address" field.

Figure 8:
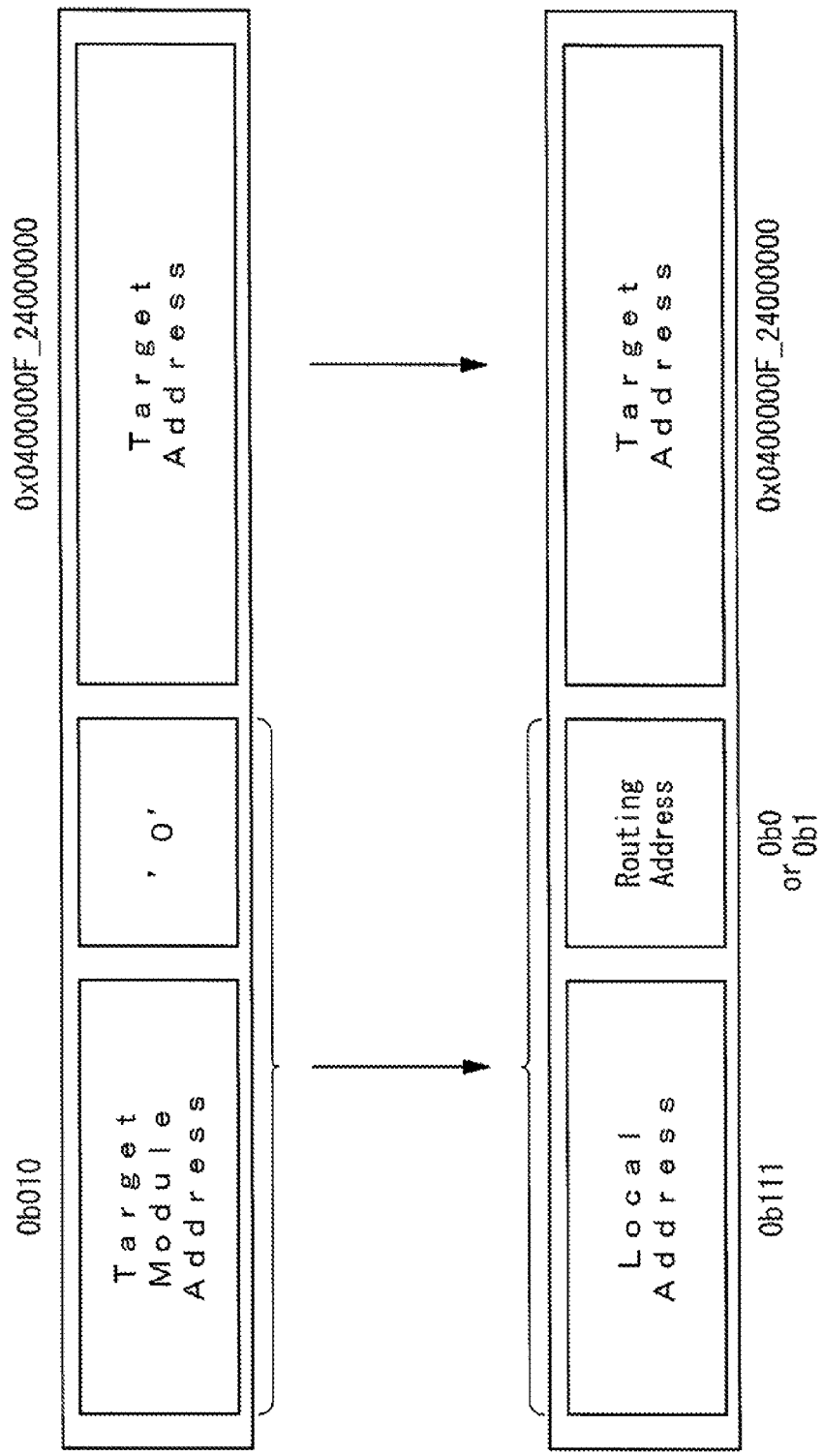
FIG. 8 is a diagram showing an address conversion method of a PCI-Express=PCI-Express bridge according to the present invention.

FIG. 8 is a diagram showing an address translation method in a PCI-Express=PCI-Express bridge. According to the present invention, each of the PCI-Express=PCI-Express bridges (e.g., bridges 114, 115, 124, 125, 134 and 135) translates the "Target Module Address" field of an address of the received packet assigned to every module into a "Local Address" field that is an address field of an address of a route complex. Also, each bridge translates the "Routing Address" field into the "Routing Address" field to indicate the route data of the packet. The "Local Address" field indicates an address field of the route complex. Here, the "Local Address" field indicates the route complex in the address of the module. For example, each bridge translates the "Target Module Address" field "0b010" of the packet received from the switch device into the "Local Address" field "0b111". Moreover, the bridge translates the "Routing Address" field "0" of the packet received from the switch device into the "Routing Address" field "0b0" or "0b1" to indicate a route including the switch device. It should be noted that each bridge holds the "Target Address" field "0x0400000F_24000000" of the packet received from the switch device as it is without translating the same. However, the present invention is not limited to these examples.

The operation of the present invention will be described below with reference to FIGS. 9 and 10. Here, a case where a packet is transmitted from the route complex (RC) 111 to the route complex (RC) 121 will be described.

Figure 9:
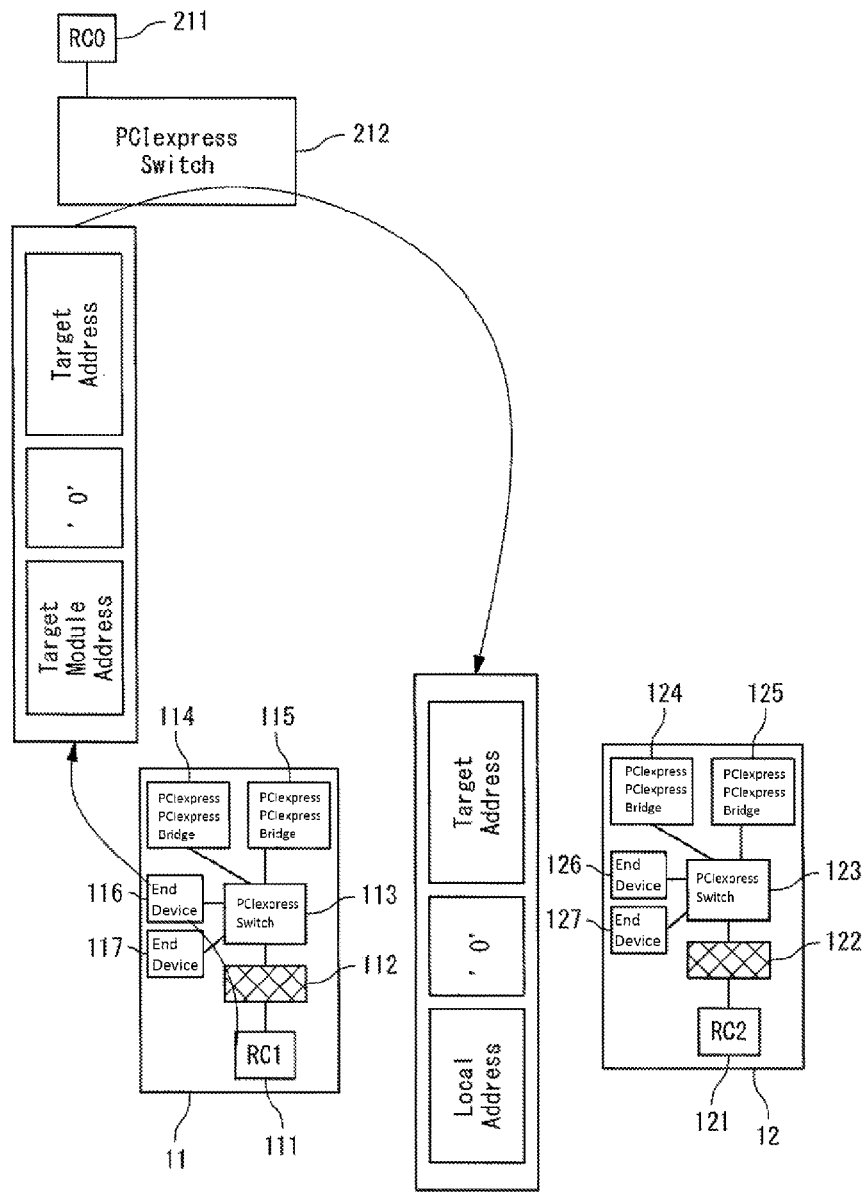
FIG. 9 is a diagram showing an embodiment of packet transfer (in case of via a switch device 21) according to the present invention.

FIG. 9 shows an operation in the case of transmitting a packet via the switch device 21. When the route complex (RC) 111 transmits the packet to the route complex (RC) 121, the address of the packet is set to have a "Target Module Address" field indicating the module 12 which includes a target route complex (RC) 121, and the resultant packet is sent out. That is, the "Target Module Address" field is set in the address of the packet sent from the route complex (RC) 111 to indicate the module 12.

The address filter 112 receives the packet from the route complex (RC) 111 and sends the packet to the switch 113 as it is. At this time, in the address filter 112 shown in FIG. 5, the route complex connecting section 1123 receives the packet from the route complex (RC) 111 and sends the packet to the intra-module connecting section 1121 as it is. The intra-module connecting section 1121 sends the packet to the switch 113 as it is. The switch 113 receives the packet from the address filter 112 and sends the packet to the bridge 114. The selection of which of the bridge 114 and the bridge 115 the switch 113 sends the packet to is omitted here, since it can be handled by the convention technique relating to route selection in the PCI-Express communication. When the bridge 114 receives the packet from the switch 113, the bridge 114 transmits the packet to the switch device 21 as it is without executing address-translation.

The switch 212 receives the packet from the bridge 114. The switch 212 determines a transfer destination module by referring to the address of the packet and transmits the packet to the transfer destination module. Since the "Target Module Address" field indicates the module 12 as the destination module, the switch 212 transmits the packet to the module 12.

The bridge 124 receives the packet from the switch 212 and internally performs the address-translation of the received packet so that the "Target Module Address" filed is translated to a "Local Address" field. Since the bridge 124 receives the packet from a route passing through the switch device 21, the current data of the "Routing Address" field is translated into the data "0" to indicate the route. Here, since the bridge 124 always receives packets from the switch device 21 when receiving the packets from an external switch device, it may be designed that the data of the "Routing Address" field of the received packet is unconditionally translated into "0". Then, the bridge 124 sends the packet to the switch 123.

At this time, in the bridge 124, the switch side connecting section 1241 receives the packet from the switch device 21 and sends it to the address translating section 1242. The address translating section 1242 includes the translation source address registers 12421 and the translation address register 12422. The translation source address registers 12421 are equivalent to the translation source address registers 11421, and the translation address register 12422 is equivalent to the translation address register 11422. The address translating section 1242 receives the packet from the switch side connecting section, extracts an address from the received packet, and compares the "Target Module Address" field as an upper-bit field of the extracted address with the address fields stored in the translation source address registers 12421.

It is assumed that the translation source address registers 12421 previously store the "Target Module Address" fields as the upper-bit fields. When the upper-bit field of the extracted address from the packet is coincident with the address field stored in the translation source address register 12421, the address translating section 1242 replaces the upper-bit field of the extracted address by the "Local Address" field stored in the translation address register 12422, to thereby convert the packet. It is assumed here that the translation address register 12422 previously stores the "Local Address" field. Also, the address translating section 1242 translates the current data "0" of the "Routing Address" field into the data "0" to indicate a route via the switching device 21. It is noted here that the data "0" indicating the route via the switching device 21 may be stored in the translation address register 12422.

Then, the address translating section 1242 transmits the converted packet to the intra-module connecting section 1243. The intra-module connecting section 1243 sends the converted packet to the switch 123. The switch 123 receives the packet from the bridge 124 and sends it to the address filter 122. At this time, the switch 123 sends the packet received from the bridge 124 to the devices 126 and 127. Here, at least one of the devices 126 and 127 is a memory, a buffer, a register or the like that stores the "Routing Address" field translated by the bridge 124. The data of the stored "Routing Address" field is "0".

In this operation, if the "Routing Address" field is translated by the bridge 124, an address range of the packet becomes abnormal and there is a possibility that error check and so forth such as CRC (Cyclic Redundancy Check) cannot be correctly performed. Therefore, in the address filter 122, the data of the "Routing Address" field is set back to the data before the translation to limit the address range. In order to limit the address range, the address filter 122 replaces the data of the "Routing Address" field by "0" and sends the packet to the route complex (RC) 121.

At this time, in the address filter 122, the intra-module connecting section 1221 receives the packet from the switch 123 and sends it to the address filtering section 1222. The address filtering section 1222 includes the filter register 12221 equivalent to the filter register 11221 shown in FIG. 5. The filter register 12221 stores the data "0" as the data of the "Routing Address" field for limiting the address range. The filter register 12221 may previously stores the data of the "Routing Address" field or receive the data before the translation from the bridge 124 when the address-translation is performed by the bridge 124. The address filtering section 1222 receives the packet from the intra-module connecting section 1221, extracts an address from the received packet, and replaces a specific address bit as the "Routing Address" field by the data "0" stored in the filter register 12221. The address filtering section 1222 translates the data of the "Routing Address" field from "0" to "0". Then, the address filtering section 1222 sends the packet to the route complex connecting section 1223. The route complex connecting section 1223 receives the packet from the address filtering section 1222 and sends it to the route complex (RC) 121.

The route complex (RC) 121 receives the packet from the address filter 122. Although not shown, the route complex (RC) 121 may send the packet to a CPU. Upon receipt of the packet, the route complex (RC) 121 executes an error check such as CRC by referring to the address fields of the packet. When an error is detected in the packet, the route complex (RC) 121 specifies a problematic route based on the "Routing Address" field by referring to the "Routing Address" field stored in at least one of the devices 126 and 127. In this example, it can be said that the "Routing Address" field is not externally changed.

Figure 10:
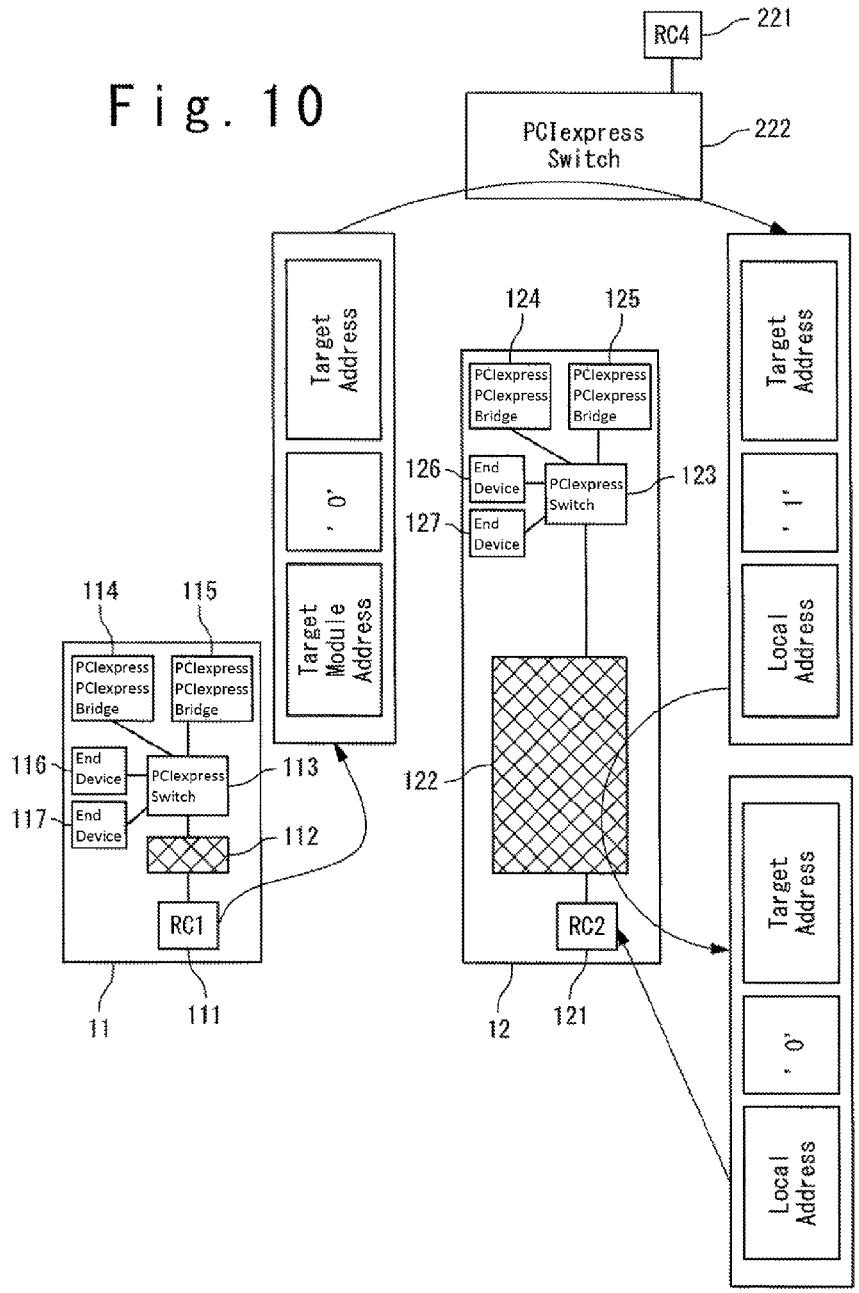
FIG. 10 is a diagram showing an embodiment of the packet transfer (in case of via a switch device 22) according to the present invention.

FIG. 10 shows an operation in the case of transmitting a packet via the switch device 22. When the route complex (RC) 111 sends a packet to the route complex (RC) 121, the address of the packet is set so that the "Target Module Address" field indicates the module 12 which includes a target route complex (RC) 121, and the resultant packet is sent out. That is, the "Target Module Address" field is set in the address of the packet sent to the route complex (RC) 111, so as to indicate the module 12.

The address filter 112 receives the packet from the route complex (RC) 111 and sends the packet to the switch 113 as it is. At this time, in the address filter 112 shown in FIG. 5, the route complex connecting section 1123 receives the packet from the route complex (RC) 111 and sends the packet to the intra-module connecting section 1121 as it is. The intra-module connecting section 1121 sends the packet to the switch 113 as it is. The switch 113 receives the packet from the address filter 112 and sends the packet to the bridge 115. The selection of which of the bridge 114 and the bridge 115 the switch 113 sends the packet to is omitted, since it can be handled by the conventional technique relating to route selection in the PCI-Express communication. When the bridge 115 receives the packet from the switch 113, the bridge 115 transmits the packet to the switch device 222 as it is without executing the address-translation.

The switch 222 receives the packet from the bridge 115. The switch 222 determines a transmission destination module by referring to the address of the packet and sends the packet to the transmission destination module. Since the "Target Module Address" field indicates the module 12 as the destination module, the switch 222 transmits the packet to the module 12.

The bridge 125 receives the packet from the switch 222 and internally performs the address-translation of the received packet so that the "Target Module Address" field is translated into the "Local Address" field. Since the bridge 125 receives the packet through a route passing through the switch device 22, the current data "0" of the "Routing Address" field is translated into the data "1" to indicate the route. Here, since the bridge 125 always receives the packet from the switch device 22 when receiving a packet from an external switch device, the data of the "Routing Address" field of the received packet may be unconditionally translated into "1". Then, the bridge 125 sends the packet to the switch 123.

At this time, in the bridge 125, the switch side connecting section 1251 receives the packet from the switch device 22 and sends it to the address translating section 1252. The address translating section 1252 includes the translation source address registers 12521 and the translation address register 12522. The translation source address registers 12521 are equivalent to the translation source address registers 11521, and the translation address register 12522 is equivalent to the translation address register 11522. The address translating section 1252 receives the packet from the switch side connecting section 1251, extracts the address from the received packet, and compares the "Target Module Address" field as an upper-bit field of the extracted address with an address field stored in the translation source address register 12521. It is assumed that the translation source address register 12521 previously stores the "Target Module Address" field as the upper-bit field of the address.

When the upper-bit field of the address of the packet is coincident with the address field stored in the translation source address register 12521, the address translating section 1252 replaces a portion of the extracted address by the "Local Address" field of the translation address register 12522, thereby converting the packet. It is assumed here that the translation address register 12522 previously stores the "Local Address" field. The address translating section 1252 translates or converts the current data "0" of the "Routing Address" field into the data "1" to indicate the route via the switching device 22. It is noted here that the data "1" may be stored in the translation address register 12522 to indicate the route via the switching device 22. Then, the address translating section 1252 sends the converted packet to the intra-module connecting section 1253. The intra-module connecting section 1253 sends the converted packet to the switch 123.

The switch 123 receives the packet from the bridge 125 and sends it to the address filter 122. At this time, the switch 123 may send the packet received from the bridge 125 to the devices 126 and 127. Here, at least one of the devices 126 and 127 is a memory, a buffer, a register or the like that stores the "Routing Address" field translated by the bridge 125. The data of the stored "Routing Address" field is "1".

In order to limit an address range, the address filter 122 replaces the data of "Routing Address" field by "0" and sends the packet to the route complex (RC) 121. At this time, in the address filter 122, the intra-module connecting section 1221 receives the packet from the switch 123 and sends it to the address filtering section 1222. The address filtering section 1222 includes the filter register 12221 equivalent to the filter register 11221 shown in FIG. 5.

Here, the filter register 12221 stores the data "0" as the data of the "Routing Address" field to limit the address range. The filter register 12221 may previously store the data of the "Routing Address" field or receive the data before translation from the bridge 125 when the address-translation is performed by the bridge 125. The address filtering section 1222 receives the packet from the intra-module connecting section 1221, extracts an address from the received packet, and replaces a specific address bit as the "Routing Address" field by the data "0" of the filter register 12221. Here, the address filtering section 1222 translates the data of the "Routing Address" field from "1" to "0". Then, the address filtering section 1222 sends the packet to the route complex connecting section 1223. The route complex connecting section 1223 receives the packet from the address filtering section 1222 and sends it to the route complex (RC) 121.

The route complex (RC) 121 receives the packet from the address filter 122. Although not shown, the route complex (RC) 121 may send the packet to a CPU. Upon receipt of the packet, the route complex (RC) 121 executes an error check such as CRC by referring to the address of the packet. When any error is detected in the packet, the route complex (RC) 121 specifies a problematic route based on the "Routing Address" field by referring to the "Routing Address" field stored in at least one of the devices 116 and 117.

In a network communication system, it is necessary to prepare an alternative route at the time of occurrence of a communication failure. When PCI-Express communication modules of different topologies are connected, an address translating function is implemented inside the bridge in a case of PCI-Express=PCI-Express bridge since the address is separated for every topology. However, since an address assigned to a same target is the same irrespective of a route, the communication route cannot be determined.

In order to solve This problem, in the present invention, the address translation is executed by the PCI-Express switch such that a different address is assigned for every route within the address space for the route complex.

The PCI-Express communication system of the present invention includes a plurality of PCI-Express switches having a plurality of PCI-Express connection ports, and a plurality of modules having route complexes. PCI-Express=PCI-Express bridges are provided for the modules to have a function for the PCI-Express communication between one of the route complexes belongs and another PCI-Express communication system to which another route complex belongs. Further, there is implemented an address filtering function of limiting an address range for a packet to be inputted to the route complex. Furthermore, when a plurality of routes exist from a certain route complex to another route complex, there is implemented a function of assigning a parameter for every route to a target address. Also, an address translation of a packet sent via the PCI-Express=PCI-Express bridge is performed.

In the present invention, it becomes possible to discriminate a packet passage route by assigning a different address for every route when performing the address translation. If different address is assigned for every route upon execution of the address translation, accesses to a same space are mapped to different spaces since the final addresses are different in reaching the same route complex. This problem can be solved by implementing a PCI-Express device to have an address filtering function in a front stage of the route complex, so that it is possible to execute the address translation to the same address space.

Moreover, in the present invention, when there is an error such as a CRC error in the packet, a route can be determined by obtaining route data in the route complex side that receives a packet. Since the route can be determined, a failure can be previously avoided by switching the bus.

It should be noted that, although an example of using PCI-Express has been described, the present invention is not limited to PCI-Express communication, and other specifications such as an extension, application or development of PCI-Express, or a specification similar to PCI-Express may be used.

Although the present invention has been described in connection with the embodiments, it should be noted that it would be apparent to those skilled in the art that various modifications are included within the scope of the present invention.

What is claimed is:

1. A PCI-Express communication system comprising:
a first PCI-Express=PCI-Express bridge connected with an external route complex through a first PCI-Express switch, and configured to perform an address translation on a packet received from said first PCI-Express switch to assign a parameter indicating a first route to a target address of the packet;
a second PCI-Express=PCI-Express bridge connected with said external route complex through a second PCI-Express switch, and configured to perform a different address translation from the first PCI-Express switch on a packet received from said second PCI-Express switch to assign a parameter indicating a second route to a target address of the packet;
an address filter configured to limit an address range for the packet received from one of said first PCI-Express=PCI-Express bridge and said second PCI-Express=PCI-Express bridge; and
a route complex configured to receive the packet from said address filter.

2. The PCI-Express communication system according to claim 1, wherein each of said first PCI-Express=PCI-Express bridge and said second PCI-Express=PCI-Express bridge performs the address translation of a target module address indicating a transmission destination of the received packet into a local address indicating an address space of said route complex, and translates a routing address assigned as the parameter indicating the route into a data determined dependently on the route.

3. The PCI-Express communication system according to claim 2, wherein said address filter comprises a filter register configured to store a new routing address to limit the address range, and replaces the routing address of the packet received from one of said first PCI-Express=PCI-Express bridge and said second PCI-Express=PCI-Express bridge by the new routing address.

4. The PCI-Express communication system according to claim 1, further comprising:
a switch configured to receive the packet from one of said first PCI-Express=PCI-Express bridge and said second PCI-Express=PCI-Express bridge, and send the received packet to said address filter; and
a device connected with said switch and configured to store the parameter assigned to the packet received by said switch.

5. The PCI-Express communication system according to claim 4, wherein said route complex confirms presence or absence of a CRC (Cyclic Redundancy Check) error in the packet received from said address filter, and specifies a failed route by referring to the parameter stored in said device, when the error is present.

6. The PCI-Express communication system according to claim 5, wherein said address filter sends the packet sent from the said route complex to said switch just as it is,
   said switch sends the packet sent from said address filter to one of said first PCI-Express=PCI-Express bridge and said second PCI-Express=PCI-Express bridge as a sending destination, and
   said sending destination sends out the packet without performing the address translation, when the packet is received from said switch.

7. A PCI-Express communication method comprising:
   receiving a first packet from an external route complex through a first PCI-Express switch;
   receiving a second packet from said external route complex through a second PCI-Express switch;
   performing an address translation on the first packet to assign a parameter indicating a first route to a target address of the first packet in a first PCI-Express=PCI-Express bridge;
   performing a different address translation from the first PCI-Express switch on the second packet to assign a parameter indicating a second route to the target address of the second packet in a second PCI-Express=PCI-Express bridge;
   limiting an address range for a reception packet as one of the first packet received from said first PCI-Express=PCI-Express bridge and the second packet received from said second PCI-Express=PCI-Express bridge; and
   receiving by a route complex, the reception packet from said address filter.

8. The PCI-Express communication method according to claim 1, wherein said performing an address translation comprises:
   performing the address translation of a target module address indicating a transmission destination of the packet into a local address indicating an address space of said route complex; and
   translating a routing address assigned as the parameter indicating the route into a data determined dependently on the route.

9. The PCI-Express communication method according to claim 8, wherein said limiting an address range comprises:
   replacing the routing address of the packet from said bridge by a new routing address which has been stored in a filter register.

10. The PCI-Express communication method according to claim 7, further comprising:
    receiving the packet from one of said first PCI-Express=PCI-Express bridge and said second PCI-Express=PCI-Express bridge;
    sending the received packet to said address filter through said switch; and
    storing the parameter assigned to the packet received by said switch in a device.

11. The PCI-Express communication method according to claim 10, further comprising:
    confirming by said route complex, presence or absence of a CRC (Cyclic Redundancy Check) error in the packet received from said address filter; and
    specifying a failed route by referring to the parameter stored in said device, when the error is present.

12. The PCI-Express communication method according to claim 11, further comprising:
    sending the packet from the said route complex to said switch through said address filter just as it is;
    sending the packet from said switch to one of said first PCI-Express=PCI-Express bridge and said second PCI-Express=PCI-Express bridge as a sending destination; and
    sending the packet said sending destination without performing the address translation, when the packet is received from said switch.

* * * * *